United States Patent [19]

Fahlen et al.

[11] 4,077,018
[45] Feb. 28, 1978

[54] HIGH POWER GAS TRANSPORT LASER

[75] Inventors: Theodore S. Fahlen, San Jose; Russell F. Kirk, Sunnyvale, both of Calif.

[73] Assignee: GTE Sylvania Incorporated, Mountain View, Calif.

[21] Appl. No.: 662,941

[22] Filed: Mar. 1, 1976

[51] Int. Cl.² ............................................. H01S 3/097
[52] U.S. Cl. ............................................. 331/94.5 PE
[58] Field of Search .................. 331/94.5 G, 94.5 PE, 331/94.5 D; 330/4.3

[56] References Cited

U.S. PATENT DOCUMENTS

| 3,557,096 | 5/1971 | Bridges et al. | 331/94.5 PE |
|---|---|---|---|
| 3,772,610 | 11/1973 | Foster et al. | 331/94.5 G |
| 3,860,887 | 1/1975 | Hoag et al. | 331/94.5 G |

Primary Examiner—William L. Sikes
Assistant Examiner—Marcus S. Rasco
Attorney, Agent, or Firm—John F. Lawler

[57] ABSTRACT

Continuous wave (CW) output power from a gas transport laser is substantially increased by disposing a plurality of parallel cylindrically tubular cathodes in the main stream transversely of the direction of gas flow and spaced above a coextensive segmented anode in the opposite wall of the channel. Ballast resistors are connected between the cathodes, respectively, and the power supply to optimize the uniform arcless distribution of current passing between each cathode and the anode. Continuous output power greater than 3 kw is achieved with this electrode configuration.

1 Claim, 3 Drawing Figures

HIGH POWER GAS TRANSPORT LASER

BACKGROUND OF THE INVENTION

This patent relates to high power gas transport lasers.

U.S. Pat. No. 3,772,610 describes a relatively compact carbon dioxide laser capable of producing continuous output power of 1 to 2 kw at 10.6 $\mu$. This laser has been used successfully for cutting, welding and other industrial purposes but is limited as indicated above in its power generating capabilities. There is a continuing need for still higher power industrial lasers of this type while nevertheless retaining the advantages of practicable weight and size. There is no known prior art laser having these features and specifications.

Another prior art high power CW laser system utilizes several hundred individually ballasted cathode pins which project into the gas lasing medium opposite the anode structure. The disadvantages of the pin cathode construction is complexity and cost, and difficulty in adequately cooling the pins thereby necessitating use of high melting point materials that may tend to contaminate the gas mixture.

OBJECTS AND SUMMARY OF THE INVENTION

A general object of this invention is the provision of a high power (>3 kw) CW laser.

A further object is the provision of such a high power laser of a practicable size and weight.

These and other objects of the invention are achieved with a flowing gas laser having a plurality of parallel transverse cylindrically tubular individually ballasted cathodes spaced substantially above a segmented anode. Such cathode configuration enables formation of a uniform arcless electrical discharge having an extremely high current density in the lasing region that permits the generation of a CW high power laser beam.

DESCRIPTION OF PREFERRED EMBODIMENT

Figure 1:
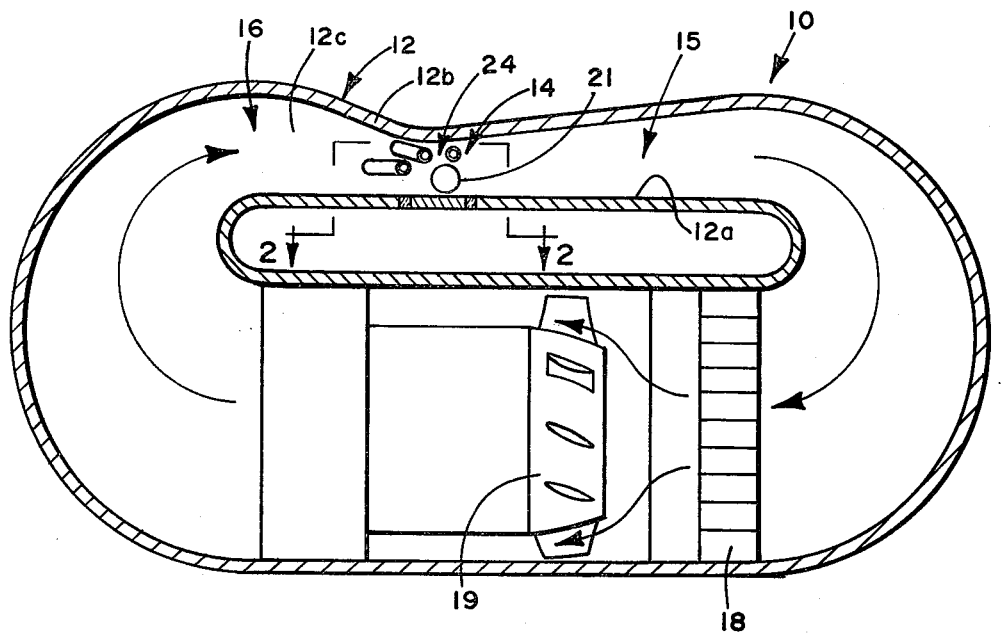
FIG. 1 is a schematic vertical section of a closed cycle gas transport laser embodying the invention.
Figure 2:
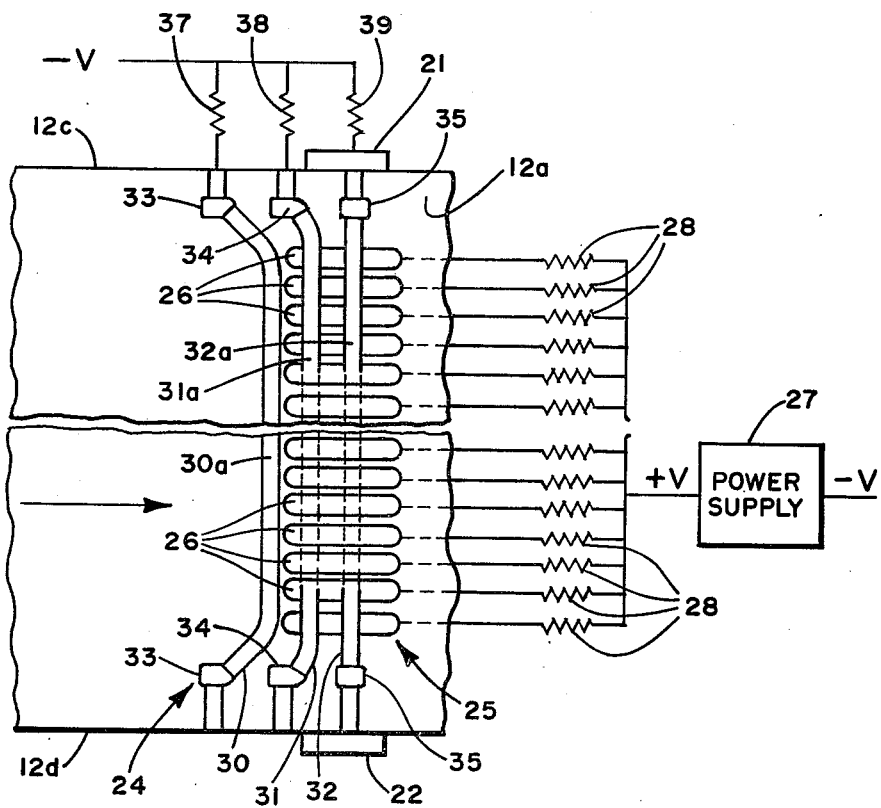
FIG. 2 is an enlarged view of the lasing region of the apparatus showing the electrode arrangement, the view being taken on line 2—2 of FIG. 1.
Figure 3:
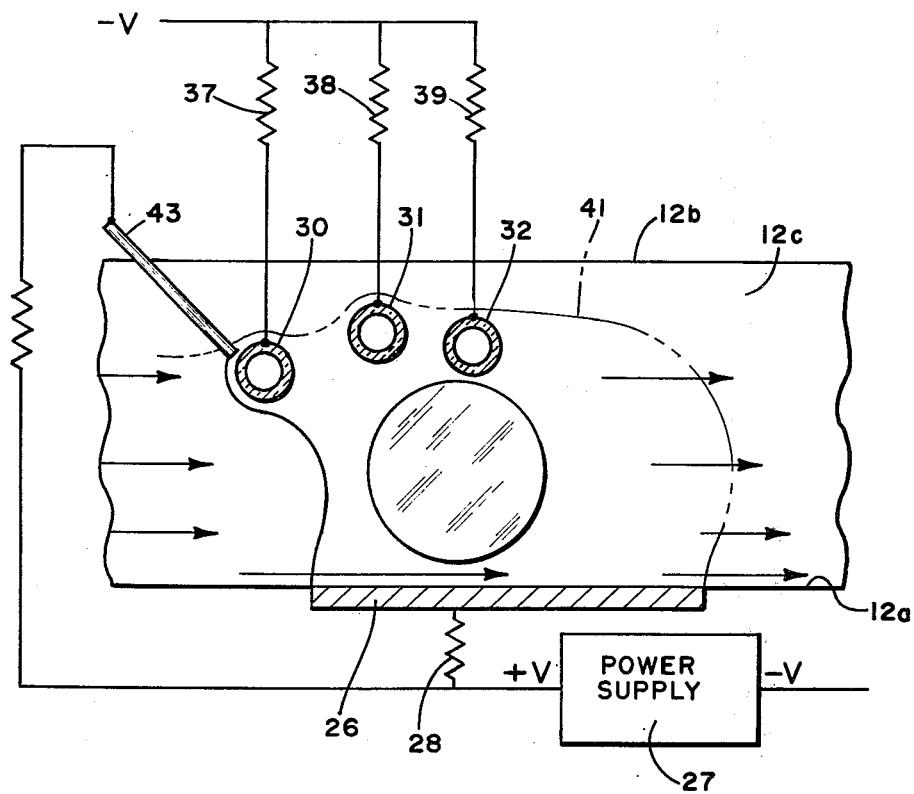
FIG. 3 is an enlarged view of part of FIG. 1 showing the discharge envelope between the cathode and anode.

Referring now to the drawings, FIG. 1 is a schematic representation of a closed cycle high power gas transport laser system 10 having a channel or duct 12 with a bottom wall 12a, see FIGS. 2 and 3, a top wall 12b and side walls 12c and 12d generally configured to define a closed fluid path through which a gas mixture is recirculated in the direction of the arrows. The channel preferably has a rectangular cross-sectional shape and has a narrow or throat section 14 which defines the active or lasing region of the system, a diffuser zone 15 on the downstream side of the active region in which the gas velocity is reduced, and a nozzle section 16 upstream from the active region in which the gas velocity is increased prior to entering the throat. The remainder of the laser system includes a heat exchanger 18 which removes heat from the gas flowing through it and a vane-axial blower 19 which circulates the gas through the channel. The gas mixture preferably used in this system consists of helium, nitrogen and carbon dioxide in well known proportions that support lasing action in the active region 14 for producing coherent light at 10.6 $\mu$.

Mounted in the side walls of the channel in optical alignment with the lasing region are mirrors 21 and 22 between which the beam is reflected when the system is operated either as an oscillator or as an amplifier. In practice, mirrors 21 and 22 are constructed so as to reflect the coherent beams several times through the active region before it exits as the output, thus increasing the effective length of the laser without increasing its physical size.

The electric discharge in the lasing region 14 of the laser extends between a cathode generally indicated at 24 and an anode 25. Anode 25 consists of a plurality of segments or pads 26 mounted in the channel bottom wall 12a in a row generally parallel to and coextensive with cathode 24. Pads 26 are electrically insulated from each other and have rounded or curved trailing edges as shown. The anode is energized by electrical connection of pads 26 to the positive terminal $+V$ of power supply 27 through ballast resistors 28, respectively, as shown.

The above described laser system, except for the cathode construction described below, is disclosed in the foregoing patent and does not per se constitute this invention.

Cathode 24 comprises three separate cylindrically tubular conductors 30, 31 and 32 which have straight central portions 30a, 31a and 32a parallel to each other and coextensive with anode 25. These portions 30a, 31a and 32a of the cathode carry the discharge current into the flowing gas and are located generally above and on the upstream side of the anode. Conductors 30, 31 and 32 are mounted at opposite ends on insulators 33, 34 and 35, respectively, suitably supported on the side walls 12c and 12d of the channel as shown. A cooling system, not shown, is adapted to flow a coolant through each cathode conductor for cooling same. The negative terminal $-V$ of power supply 27 is connected to conductors 30, 31 and 32 through ballast resistors 37, 38 and 39, respectively. The spacing between the straight portions 30a, 31a and 32a of the cathode conductors as well as their heights above anode pads 26 may be unequal as required to optimize the maintenance of an arcless electric discharge in the flowing gas between the cathode and anode. The profile of this electric discharge is indicated schematically in broken lines 41 in FIG. 3. A starter electrode 43 described in the foregoing patent is positioned close to cathode conductor 30 to facilitate initiation of the glow discharge during start-up of the laser.

In operation, the output of power supply 27 is applied across the cathode and anode as starter electrode 43 initially generates ions at cathode conductor 30. These ions flow downstream into the lasing region and lower the threshold potential so that an arcless electric discharge is established between the three cathode conductors and the anode. This discharge produces a population inversion in the atomic structure of the carbon dioxide gas mixture which generates coherent light in the well known manner. The positions of cathode conductors 30, 31 and 32 relative to each other and to anode pads 26 permits the highly dense electron stream to flow from the cathode conductors through the gas to the anode pads without arcing. The current carried by the cathode conductors is optimized by selection of the ballast resistors with appropriate values depending upon other operating parameters of the system such as gas pressure, temperature and velocity. The values of these resistors may be and generally are different.

A gas transport laser system embodying the invention and which has been built and operated successfully has the following physical and electrical characteristics:

| a. | General | |
|---|---|---|
| | Type of laser system | Closed cycle recirculating continuous output |
| | Gas Mixture (by volume) | 76% helium, 17% nitrogen, 7% carbon dioxide |
| | Gas Pressure | 35 torr |
| | Gas Velocity in Throat | 50 meters per second |
| b. | Mechanical | |
| | Cathode | |
| | Number of conductors | Three |
| | Material | Copper tubing |
| | Anode Pads | |
| | Number | 54 |
| | Length | 36 inches |
| c. | Electrical | |
| | Output beam | |
| | Power (continuous) | 3.4 kw |
| | Diameter | 50 mm |
| | Mode | Unstable resonator (ring mode) |
| | Wavelength | 10.6 $\mu$ |
| | Input power (at maximum capacity) | 100 kw |
| | Current (at 3 kw output beam power) | 18 amps |
| | Voltage (operating) | 3,000 volts |

What is claimed is:

1. High power gas transport laser apparatus comprising a channel having top and bottom walls and side walls, a gas mixture comprising carbon dioxide in said channel, means for moving said gas mixture through said channel at a predetermined velocity, means for producing an electric discharge in said gas mixture transversely of the direction of flow comprising three cylindrically tubular cathodes disposed between said top and bottom walls transversely of the direction of said gas flow and being spaced from each other in the direction of said gas flow, a plane segmented anode adjacent to said bottom wall and extending substantially under and parallel to said cathodes, said cathodes being spaced differently above said anode and having straight parallel spaced portions extending transversely of the direction of gas flow and coextensive with said anode, a ballast resistor connected in series between each of said cathodes and said energizing means, the values of said ballast resistors being different, and means for electrically energizing said cathodes and anode to establish therebetween a glow mode electric discharge through said flowing gas mixture, and mirror means adjacent the side walls of the channel and optically aligned with said electric discharge for directing a beam of coherent light therethrough.

* * * * *